(12) United States Patent
Murase et al.

(10) Patent No.: US 7,936,419 B2
(45) Date of Patent: *May 3, 2011

(54) ILLUMINATION LIGHT SOURCE AND IMAGE DISPLAY APPARATUS

(75) Inventors: Rena Murase, Tokyo (JP); Yoko Inoue, Tokyo (JP); Tomohiro Sasagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 531 days.

This patent is subject to a terminal disclaimer.

(21) Appl. No.: 12/000,287

(22) Filed: Dec. 11, 2007

(65) Prior Publication Data

US 2008/0259605 A1    Oct. 23, 2008

(30) Foreign Application Priority Data

Mar. 29, 2007    (JP) .................................. 2007-086715

(51) Int. Cl.
 *G02F 1/1335* (2006.01)
(52) U.S. Cl. ............................................ 349/62; 349/61
(58) Field of Classification Search .............. 349/61–67; 250/205; 385/31, 33–34, 27; 362/559
See application file for complete search history.

(56) References Cited

U.S. PATENT DOCUMENTS

| | | | |
|---|---|---|---|
| 6,611,643 B2 * | 8/2003 | Birk et al. ....................... | 385/33 |
| 7,434,939 B2 * | 10/2008 | Tajiri .............................. | 353/85 |
| 7,672,550 B2 * | 3/2010 | Murase et al. ................. | 385/31 |

FOREIGN PATENT DOCUMENTS

| | | |
|---|---|---|
| JP | 6-167640 A | 6/1994 |
| JP | 11-223795 A | 8/1999 |
| JP | 11-326653 A | 11/1999 |
| JP | 2000-268603 A | 9/2000 |
| JP | 2004-144936 A | 5/2004 |
| JP | 2004-146793 A | 5/2004 |

* cited by examiner

*Primary Examiner* — Dung T. Nguyen
(74) *Attorney, Agent, or Firm* — Birch, Stewart, Kolasch & Birch, LLP

(57) ABSTRACT

An illumination light source includes a coherent light source in which a plurality of light emitting points that emit coherent light beams are arranged in a one-dimensional array; and a light magnifying unit that magnifies the coherent light beams that are emitted from the light emitting points so that a diameter of light emitted from the coherent light source in a direction perpendicular to a direction of arrangement of the light emitting points is larger than a diameter in the direction of arrangement of the light emitting points. The illumination light source also includes an optical fiber; and a light-converging optical system in which a magnification is set such that light emitted from the light magnifying unit is coupled to the optical fiber, based on a maximum diameter of the light emitted from the light magnifying unit.

9 Claims, 6 Drawing Sheets

ILLUMINATION LIGHT SOURCE AND IMAGE DISPLAY APPARATUS

BACKGROUND OF THE INVENTION

1. Field of the Invention

The present invention relates to an illumination light source that employs a coherent light source, and, more particularly to an illumination light source in which a speckle noise that is caused by coherence of a light source is reduced, and an image display apparatus that employs this illumination light source.

2. Description of the Related Art

In recent years, there are many cases in which a laser is used as a light source of optical image display apparatuses. Generally, light emitted from a laser has high directivity, and therefore, light use efficiency is expected to be improved. In addition, a monochromatic property thereof realizes a wide color reproduction area that is required in image display apparatuses. Therefore, lasers are considered to be useful as an illumination light source. On the other hand, because a laser beam has high coherence, if a laser is used as a light source of an image display apparatus, there is a problem that dot patterns called a speckle noise due to interference of light is caused. This is caused because minute irregularity in devices in an illumination optical system, light bulbs, devices in a projection optical system, or on a screen causes a phase of each of light beams that have passed through different points on a device surface to shift for an amount corresponding to the irregularity, and those light beams that are coherent with each other form an interference pattern on an image surface. Because surface precision of these devices is limited, when a light source having high coherence is used, influence of the speckle noise is always a problem. With the recent advance in a laser technology, development of a semiconductor laser that is compact and high-power, and that outputs high quality beams, and the like is active, and it is expected that a laser is increasingly used as a light source of image display apparatuses in future. Therefore, establishment of a speckle noise suppression method is demanded.

The problem of speckles in image display apparatuses in which a laser is used as a light source can be solved by reducing coherence of a laser beam while maintaining the property of the laser beam. As a method of reducing coherence of laser beams, conventionally, a method in which a plurality of laser beams that are incoherent with each other are synthesized to reduce the coherence of light as a whole has been widely used. This method is realized, for example, by a method in which a coherent light beam that is generated by a single laser (resonator) is divided into a plurality of light beams that are incoherent with each other and the light beams are synthesized, or by a method in which a plurality of coherent light beams incoherent with each other that are generated by different lasers (resonators) are synthesized.

As a technique based on the former method, a technique in which a plurality of juxtaposed element lenses (microlens array) are used (see, e.g., Japanese Patent Application Laid-open No. 2000-268603) and a technique in which a plurality of fiber bundles composed of optical fiber bundles having different lengths are used (see, e.g., Japanese Patent Application Laid-open No. H11-326653) have been proposed. In these techniques, light emitted from a laser is divided into a plurality of light beams using those devices to make a difference in an optical distance between the light beams large. Thus, the light beams become incoherent with each other, thereby reducing coherence of a light source as a whole.

According to the techniques, a plurality of light beams that are incoherent with each other can be generated by a single coherent light source, and the number of the light beams can be increased by changing a configuration of the devices. Therefore, coherence of the light source can be sufficiently reduced. However, because light loss is large in light division using a microlens array or fiber bundles, high light use efficiency is not achieved. In addition, to further reduce the coherence, a great number of fibers and light division devices are required. In terms of these problems, such techniques are not suitable for image display apparatuses that are required to have a high image quality in color or brightness, and for which miniaturization of an illumination device and cost reduction are demanded.

Furthermore, in both the former and the latter methods, to obtain low-coherence light, a plurality of light beams that are obtained by division or that are emitted from different lasers are required to be synthesized in such a manner that the optical axes thereof coincide with each other. In conventional light source devices, a plurality of coherent light beams are input to a subsequent optical system without completely matching the optical axes thereof. Therefore, there is a problem that spatial overlap is small due to difference in a propagation angle caused by each of the coherent light beams passing at different positions of the optical devices. Although these coherent light beams can be arranged to have completely the same light path by using a light synthesizing device, such a device that can synthesize light beams having the same wavelength and the same polarization without any light loss is not available. If a beam splitter is used to synthesize light beams, for example, only 50% of light use efficiency is expected per light. Although light synthesis without any light loss is possible if polarization of light and a polarization beam splitter are used, it is not practical to use a plurality of polarization beam splitters and polarization rotation devices.

As described above, the conventional speckle reducing methods still have problems to be solved in terms of light use efficiency in devices, cost, and miniaturization of apparatuses.

SUMMARY OF THE INVENTION

It is an object of the present invention to at least partially solve the problems in the conventional technology.

According to an aspect of the present invention, an illumination light source includes a coherent light source in which a plurality of light emitting points that emit coherent light beams are arranged in a one-dimensional array; a light magnifying unit that magnifies the coherent light beams that are emitted from the light emitting points so that a diameter of light emitted from the coherent light source in a direction perpendicular to a direction of arrangement of the light emitting points is larger than a diameter in the direction of arrangement of the light emitting points; an optical fiber; and a light-converging optical system in which a magnification is set such that light emitted from the light magnifying unit is coupled to the optical fiber, based on a maximum diameter of the light emitted from the light magnifying unit.

According to another aspect of the present invention, an image display apparatus includes an illumination optical system that outputs illumination light and that includes the components of the illumination light source according to the present invention; a light modulating device that controls the illumination light that is input from the illumination optical system to form an image; and a display unit that displays light from the light modulating device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an illumination light source and an image display apparatus according to the present invention will be explained below in detail with reference to the accompanying drawings. Note that the invention is not limited to the embodiments.

Figure 1:
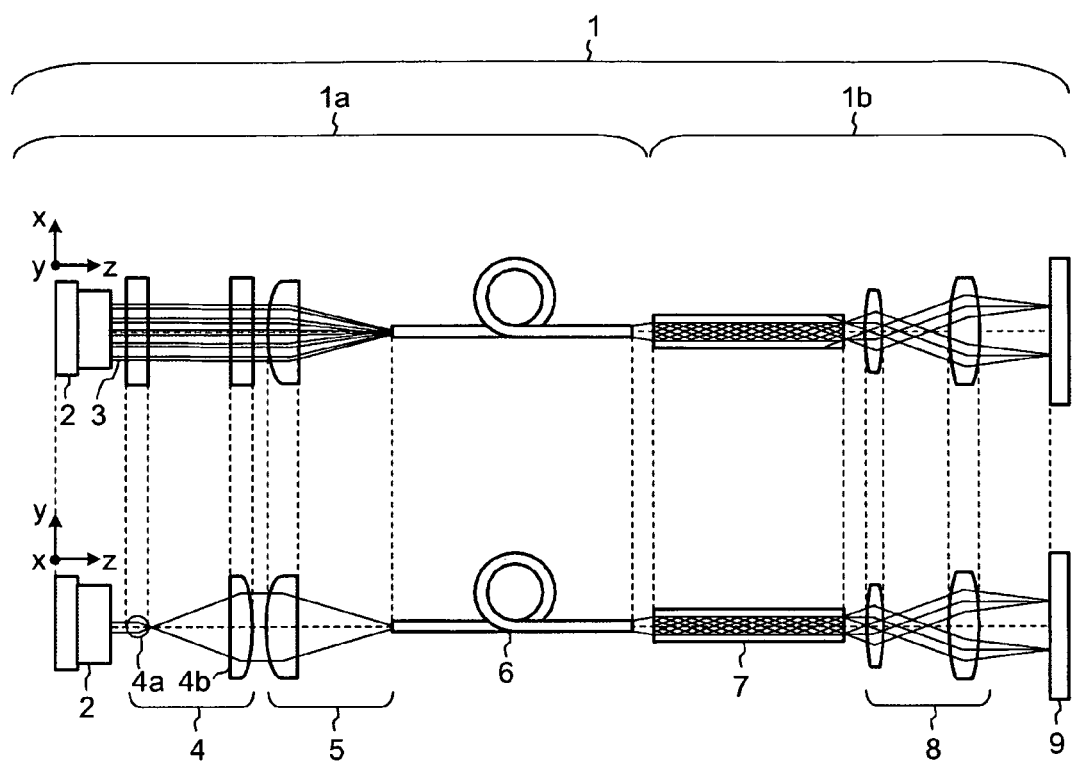
FIG. 1 is a configuration diagram of an illumination device according to a first embodiment of the present invention.

FIG. 1 is a configuration diagram of an illumination device using an illumination light source according to a first embodiment of the present invention. An illumination device 1 according to the first embodiment includes an illumination light source 1a and an illumination optical system 1b. Hereinafter, a direction of an x-axis shown in FIG. 1 is referred to as a light-emitting-point arranging direction, and a direction of a z-axis is referred to as an optical axis direction. Based on x-, y-, and z-axes, a plane defined by an axis of the light-emitting-point arranging direction and the optical axis is referred to as an xz plane, and a plane defined by an axis perpendicular to the light-emitting-point arranging direction and the optical axis is referred to as a yz plane.

The illumination light source 1a includes a surface emitting laser 2, a magnifying-lens optical system 4 that shapes a plurality of coherent light beams 3 that are emitted from the surface emitting laser 2 into a desirable shape, a light-converging optical system 5, and an optical fiber 6.

The illumination optical system 1b includes an integrator rod 7 that makes a spatial intensity distribution of light that is emitted from the optical fiber 6 uniform, an illumination optical system 8 that is constituted of a lens and a mirror, and a light bulb 9 such as a liquid crystal panel and a digital micromirror device (DMD) serving as a modulation device that provides an image signal by spatially modulating illuminated light. By further including a projection optical system (not shown) that projects on a screen in an enlarged manner to project light emitted from the light bulb 9 in an enlarged manner, and a display unit (not shown) such as a screen on which light from the projection optical system is projected, an image display apparatus such as an image projection apparatus can be configured.

Figure 2:
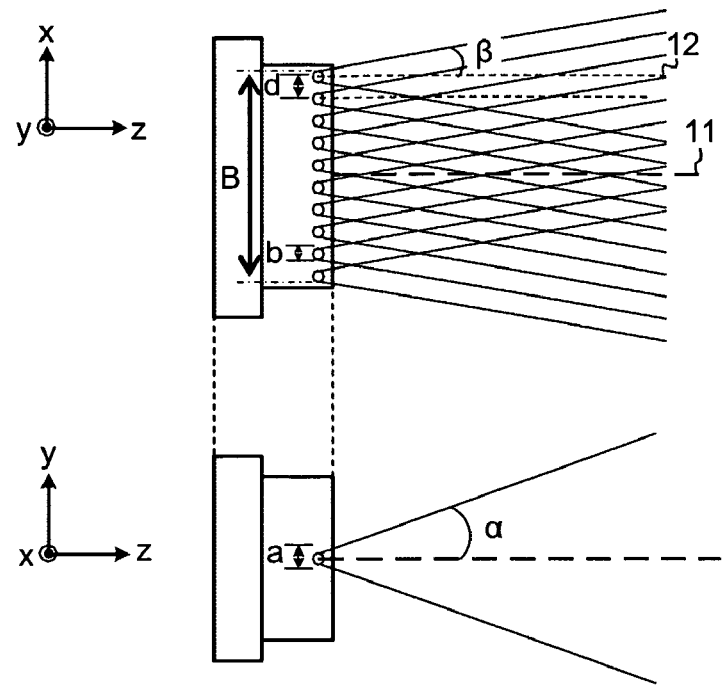
FIG. 2 is a conceptual diagram of a laser that has a structure in which a plurality of light emitting points are arranged in a one-dimensional array.

FIG. 2 is a conceptual diagram of a laser in which a plurality of light emitting points are arranged in a one-dimensional array in a light source. In this surface emitting laser 2, a plurality of light emitting points 10 are arranged at regular intervals in the x direction, and a coherent light beam whose divergence angle α on the yz plane and divergence angle β on the xz plane are both extremely close to 0 degrees is emitted from each of the light emitting points 10. The surface emitting laser 12 according to the first embodiment has 10 pieces of the light emitting points 10, the light emitting points 10 are linearly arranged at intervals of 150 micrometers, and half angles at half maximum of the divergence angles on the yz plane and the xz plane of the laser beam emitted from the light emitting points 10 are both approximately 0.2 degree. Further, in the first embodiment, as the magnifying-lens optical system 4, a rod lens 4a and a cylindrical lens 4b are combined and arranged such that a magnification effect acts only on the yz plane of the laser light. A different configuration can be applied to the magnifying-lens optical system 4 as long as a similar effect is achieved.

Because the coherent light beams emitted from the light emitting points 10 in the surface emitting laser 2 have an equal oscillation wavelength, a monochromatic property is excellent as light of the surface emitting laser as a whole. Furthermore, because each of the coherent light beams has directivity, the directivity of light as a whole is also high. On the other hand, because the coherent light beams emitted from the respective light emitting points are generated by different resonators, phases thereof are not uniform. Therefore, the coherent light beams are incoherent with each other, and the coherence of the entire surface emitting laser is low. However, because the coherence of only the coherent light beam 3 that is emitted from each of the light emitting points 10 is considerably high, to reduce influence of the speckle noise, it is necessary to reduce the coherence of each of the coherent light beams 3 that are generated from the light emitting points 10. Furthermore, to make these coherent light beams spatially overlap with each other at an emitting end of the optical fiber 6, which is an emitting end of the illumination light source 1a, and to propagate these coherent light beams keeping such spatial overlap, it is necessary to arrange such that the propagation angles and the divergence angles of the coherent light beams 3 are equal at the emitting end of the optical fiber 6. The propagation angle (δ1, δ2, . . . , δn) of each of the light emitting points is an angle that is formed by an optical axis 11 of the entire light and an axis in a propagation direction of the coherent light beam 3 emitted from each of the light emitting points. To propagate the light beams keeping the spatial overlap at the emitting end of the optical fiber 6, it is required to satisfy δ1=δ2=δ3= . . . =δn at the emitting end of the optical fiber 6. Further, the divergence angle (θ1, θ2, . . . , θn) of each of the light emitting points is an angle at which each of the coherent light beams diverges relative to an optical axis 12 of each of the coherent light beams 3, and to propagate the light beams keeping the spatial overlap at the emitting end of the optical fiber 6, it is required to satisfy θ1=θ2=θ3= . . . =θn.

First, influence of the speckle noise on the irradiation surface when a plurality of laser beams that are incoherent with each other are irradiated in an overlapped manner is described. When at a spatial position r on the irradiation surface to which light is irradiated, two light beams that have relation of a phase difference Δφa(r) expressed by a function of the position r as indicated by Equations (1) and (2) are coherent with each other, light intensity $I_{co}(r)$ of light that is synthesized from the two light beams on the irradiation surface is expressed as Equation (3) as an equation of a spatial coordinate on the irradiation surface.

$$A(r,t)=u\cdot\exp(i\phi a(r,t)) \quad (1)$$

$$A'(r,t)=u\cdot\exp[i(\phi a(r,t)+\Delta\phi a(r))] \quad (2)$$

$$I_{co}(r) \propto |A+A'|^2 = 2u^2 + 2u^2 \cos \Delta\phi a(r) \quad (3)$$

On the other hand, when the two light beams are incoherent, light intensity $I_{inco}$ of the light synthesized therefrom is expressed as Equation (4).

$$I_{inco}(r) \propto |A|^2 + |A'|^2 = 2u^2 \quad (4)$$

Figure 3:
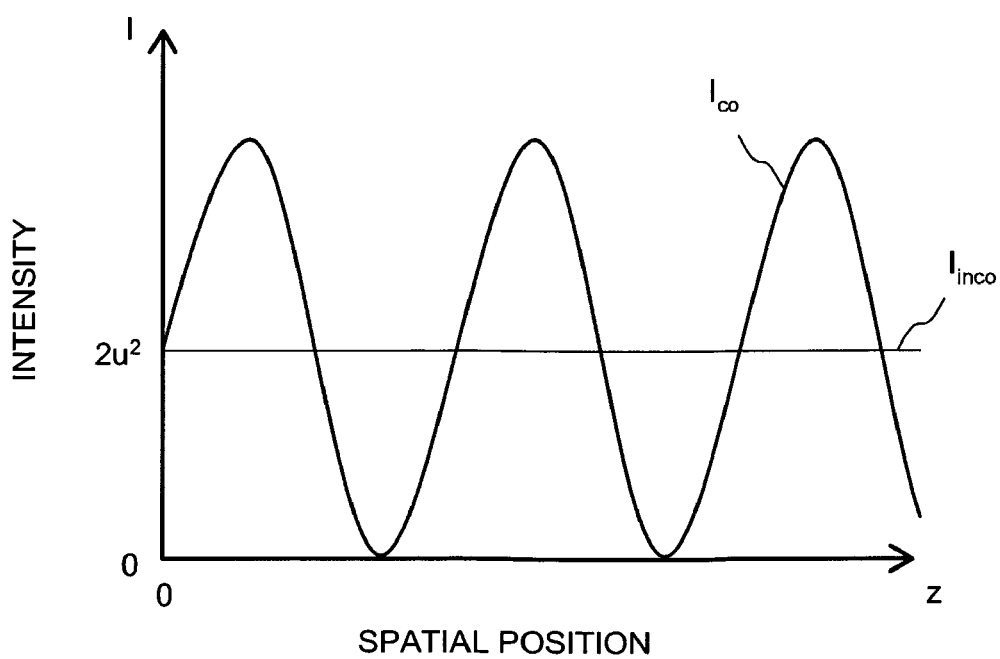
FIG. 3 is a chart of a light intensity distribution with respect to a spatial position when two light beams are overlapped.

FIG. 3 is a graph expressing these equations. As is evident from FIG. 3, the light intensity $I_{inco}$ when two light beams that are incoherent are overlapped is constant, independent of a spatial position, in other words, independent of an amount of a phase shift that is generated by the irregularity of a device. On the other hand, the light intensity $I_{co}$ when two light beams that are coherent with each other are overlapped varies in different spatial positions due to a difference in an amount of a phase shift.

Based on these facts, cases in which laser beams that are emitted from n (n≧2) pieces of light emitting points are used in a not overlapped state and a case in which the laser beams are used in a sufficiently overlapped state are compared. It is assumed that a total power $I_{total}$ reaching the irradiation surface is equal in both cases.

Figure 4:
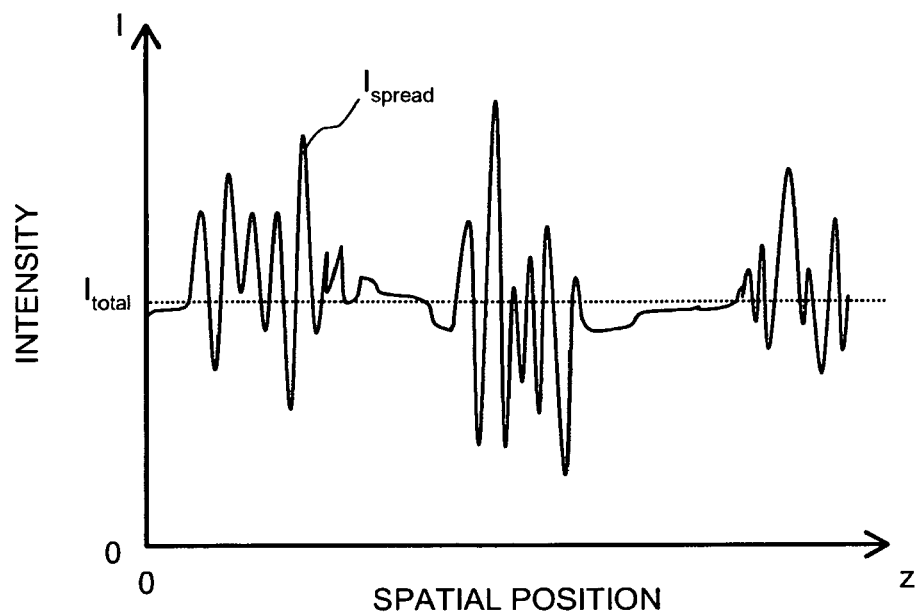
FIG. 4 is a chart of a light intensity distribution with respect to a spatial position on an irradiation surface when light beams emitted from the light emitting points are not overlapped.

When laser beams from respective light emitting points are used in a not overlapped state, the laser beams that are emitted from the respective light emitting points are spatially scattered on the irradiation surface, and an arbitrary area on the irradiation surface is to be illuminated by only a laser beam that is emitted from a signal light emitting point. Because respective light beams that are emitted from respective light emitting points and that have passed through different spatial positions of the device are coherent with each other, a complicated speckle pattern is formed in this area. Therefore, as shown in a spatial intensity distribution $I_{spread}$ shown in FIG. 4, speckle patterns that are originated from the coherence of the light beams emitted from the respective light emitting points appear in various points on the irradiation surface.

Figure 5:
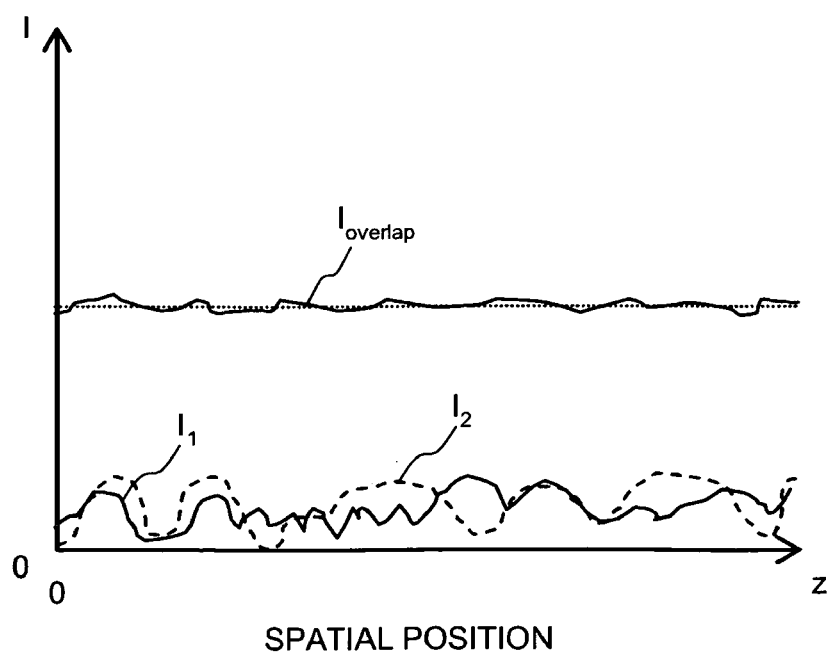
FIG. 5 is a chart of a light intensity distribution with respect to a spatial position on the irradiation surface when light beams emitted from the light emitting points are overlapped.

On the other hand, when light synthesized by overlapping the laser beams that are emitted from n pieces of the light emitting points on each other is used as a light source, all the laser beams that are emitted from the respective light emitting points illuminate the irradiation surface uniformly. Specifically, as shown in a spatial intensity distribution shown in FIG. 5, intensity amplitude I1 of a speckle pattern that is caused by the coherence of a single light emitting point is small relative to the intensity as a whole. Further, because the light beam is incoherent with a light beam emitted from the other light emitting point, respective light intensity distributions I1, I2, . . . , In are simply integrated, and an entire intensity distribution $I_{overlap}$ becomes close to constant.

Figure 6:
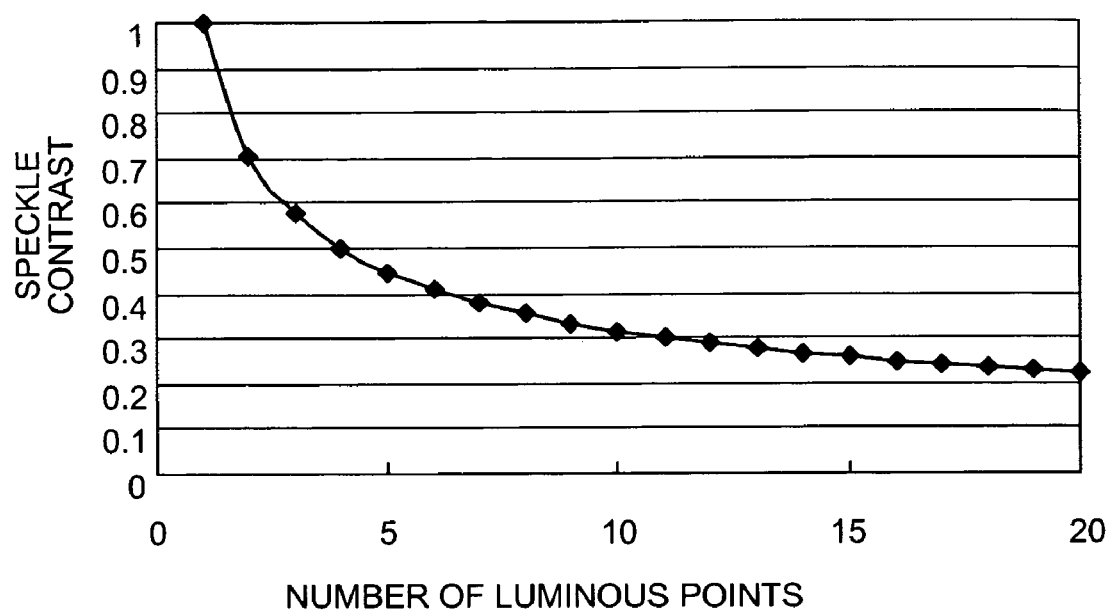
FIG. 6 is a chart of a speckle contrast with respect to the number of coherent light beams to be overlapped.

As is obvious in statistics, this can be explained from the fact that a standard deviation of mean values of a random distribution is inversely proportional to a square root of the number of samples. Therefore, a speckle contrast when coherent light beams that are emitted from n pieces of the light emitting points and that are incoherent with each other are overlapped with each other is expressed as $1/(n)^{1/2}$ of a speckle contrast that is generated by a coherent light beam emitted from a signal light emitting point, and as shown in FIG. 6, as the number of coherent light beams to be overlapped with each other increases, the speckle contrast exponentially decreases.

Furthermore, the coherence of each coherent light beam can be reduced by disarranging the phase plane thereof. When coupled to the optical fiber, the equal-phase plane thereof is distorted by a converging lens, and the distortion increases as the propagation distance increases. The distortion of the equal-phase plane is folded by multiple reflection in the optical fiber, and the equal-phase plane of the light becomes randomly distributed. Thus, the coherent of the light is reduced. Because this effect is enhanced as the frequency of multiple reflection of the light increases, it is possible to reduce the coherence by making a convergence angle of the coherent light with respect to the optical fiber large.

By thus making the convergence angle of each of the laser beams with respect to the optical fiber large, and by overlapping the laser beams that are emitted from the emitting points and that are incoherent with each other, even if the laser beams emitted from the respective light emitting points have high-coherence, the coherence of light that is synthesized from the laser beams is lowered. Furthermore, by equalizing the propagation angle of the coherent light beams to be overlapped with each other, and by equalizing the divergence angle of the coherent light beams to be overlapped with each other, the overlapped state of the light is maintained on an arbitrary xy plane in a subsequent optical system. Therefore, when the synthesized light is used as a light source of the image display apparatus, the speckle on the image display unit can be further reduced.

Figure 7:
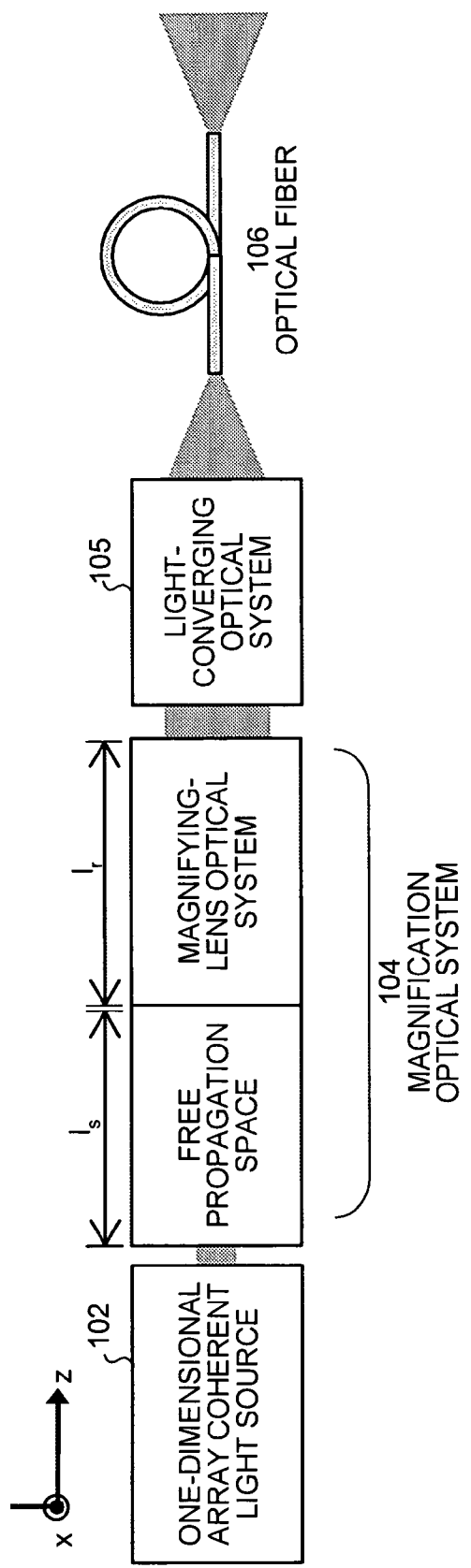
FIG. 7 is a conceptual diagram of an illumination light source according to the present invention.
Figure 8:
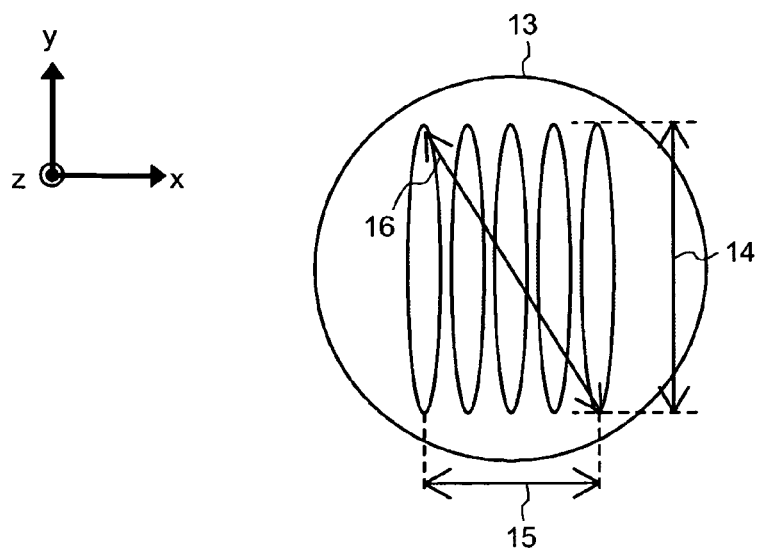
FIG. 8 is a schematic diagram of a spatial intensity distribution of a laser beam on an incident surface of a light-converging optical system required in the present invention.

FIG. 7 is a conceptual diagram of the illumination light source according to the first embodiment. The illumination light source includes a magnification optical system 104, a light-converging optical system 105, and an optical fiber 106 to equalize the spatial intensity distribution while lowering the coherence of the coherent light beams that are emitted from the respective light emitting points that are arranged in a one-dimensional array in the light source 102, to equalize the propagation angle of the coherent light beams, and to equalize the divergence angle of the coherent light beams. FIG. 8 depicts the spatial intensity distribution of light on the incident surface of the light-converging optical system 105. As shown in FIG. 8, the light emitted from the light source 102 is shaped so that a diameter 14 of the entire light on the yz plane is larger than a diameter 15 on the xz plane by the magnification optical system 104, and coupled to the optical fiber 6 by the light-converging optical system 105 whose light converging effect is designed based on the maximum diameter of the light in this yz direction. At this time the coherent light beams are respectively input to the optical fiber 106 at the maximum incident angle. Therefore, the multiple reflection can be caused frequently in the optical fiber 106, thereby disarranging wavefront of each of the coherent light beams to lower the coherence of each of the coherent light beams. Further, the maximum incident angle of each of the coherent light beams that are emitted from the light emitting points to the optical fiber 106 is dependent on the diameter 14 of the light on the yz plane, and each of the coherent light beams is coupled to the optical fiber 106 at an equal incident angle. Therefore, each of the coherent light beams that are emitted from the optical fiber has a substantially equal divergence angle on the yz plane. Furthermore, because the diameter on the xz plane is smaller than a maximum diameter 16 of the light, each of the coherent light beams has a substantially equal propagation angle.

On the other hand, the light emitting points 10 in the light source are arranged at regular intervals on the x-axis, and the diameter 15 of the light on the xz plane has a size that is determined by the number of the light emitting points, the arrangement interval thereof, and the diameter of the coherent light beams. Therefore, the coherent light beams are coupled to the optical fiber 106 at a maximum incident angle dependent on the diameter 15 also on the xz plane. However, because the diameter 15 of the light on the xz plane is a diameter formed by the coherent light beams, and each of the coherent light beams has very small convergence angle and passes through a different spatial position on an incident surface 13 of the light-converging optical system 105, each of the light beams is input to the optical fiber 106 having a different propagation angle and a different divergence angle. Therefore, if the maximum diameter 16 of the light becomes larger than the diameter of each of the coherent light beams on the incident surface 13 of the light-converging optical system 105, the frequency of the multiple reflection in the optical fiber decreases, and if the diameter 15 of the light on the xz plane becomes large, the difference in the propagation angle and the divergence angle of the coherent light beams becomes significant. Accordingly, the coherence of each of the coherent light beams is not lowered, and the overlap of the coherent light beams becomes smaller as the coherent light beams are propagated further.

However, in this apparatus, the diameter 14 of the light emitted from the coherent light source on the yz plane is shaped to be larger than the diameter 15 on the xz plane, and the light converging effect of the light-converging optical system acts more strongly on the yz plane than on the xz plane of the laser beams. Therefore, problems of reduction of the convergence angle and variations in the propagation angle and the divergence angle of the coherent light beams as described above are eased.

Furthermore, each of the coherent light beams input to the optical fiber 106 spreads to have a rotationally symmetric spatial intensity distribution relative to the center axis of the optical fiber while propagating in the optical fiber 106, thereby making the overlap with the other coherent light beam large at the emitting end of the optical fiber.

Conditions required for the present invention are specifically described below. As shown in FIGS. 2 and 7, the number of the light emitting points 10 in the coherent light source in which the multiple light emitting points 10 that emit coherent light beams are arranged in a one-dimensional array is n (n is an arbitrary number equal to or larger than 2), a distance between the light emitting points is d, diameters of the coherent light beam emitted from each of the light emitting points 10 on the yz plane and on the xz plane are a and b, respectively, the half angles at half maximums of the divergence angles on the yz plane and the xz plane are $\alpha$ and $\beta$, respectively, a spatial propagation distance from a light emitting surface of the light source to the magnifying-lens optical system is $l_s$, a distance required for the magnifying-lens optical system is $l_r$, a magnification of the magnifying-lens optical system that acts only on the yz plane is L, and a fiber diameter is c.

(a) A magnification R of the magnification optical system on the yz plane satisfies at least the following inequality:

$$R \geq \frac{B + 2(l_s + l_r)\tan\beta}{a} \left( \because R = \frac{(a + 2l_s\tan\alpha)L}{a} \right) \quad (5)$$

where B is a diameter of the entire laser beam on the xz plane, and is expressed as B=d·(n−1)+b.

(b) A magnification T in the light-converging optical system satisfies the following inequality:

$$T \leq \frac{c}{\sqrt{\{(a + 2l_s\tan\alpha)L\}^2 + \{B + 2(l_s + l_r)\tan\beta\}^2}} \quad (6)$$

(c) The optical fiber has such length that each of the coherent light beams is reflected at least once therein.

The condition indicated in an above condition (a) is to make the convergence angle of each of the coherent light beams large, and to make at least the coherent light beams that are emitted from light emitting points positioned at respective ends in the light source to be overlapped. At this time, the coherent light beams that are emitted from the light emitting points all have a region overlapping with each other. The condition (a) indicates a condition to be at least satisfied when the number of the light emitting points in the light source is n, and because the number of the coherent light beams that overlap with each other increases as the number n of the light emitting points increases, the effect of reducing the speckles is enhanced. Furthermore, as the magnification R in the magnification optical system becomes larger relative to the right side of inequality (5) when the number of the light emitting points is n, the number of coherent light beams that overlap with each other increases, and the overlapping region becomes larger. Therefore, to sufficiently reduce the speckles, it is preferable to set a value of the right side of the inequality (5) as large as possible, in other words, to design the magnification optical system so that the diameter 14 of the light on the yz plane becomes sufficiently large compared to the diameter 15 on the xz plane. Specifically, as it can be seen from FIG. 6 that indicates relation between the number of the coherent light beams to be overlapped and reduction of the speckle contrast, the speckle contrast when n=4 is reduced to half of that when n=1. Therefore, it is desirable that the coherent light beams that are emitted from four or more light emitting points are overlapped.

The above condition (b) is set to obtain high light use efficiency for light emitted from the light source. By designing the light-converging optical system so that the magnification thereof satisfies inequality (6), it becomes possible to make the convergence angle of the light large, and to make the propagation angle and the divergence angle of each of the coherent light beams that are emitted from the fiber dependent on a plane having a larger diameter out of the xz plane and the yz plane. Therefore, by combining with the magnification optical system that satisfies the condition (a), it becomes possible to make the propagation angle and the divergence angle of each of the coherent light beams coincide with those of the other coherent light beam. The light-converging optical system is required to be designed considering the compatibility with an F value of a subsequent optical system, in addition to the above condition (b).

The above condition (c) is to lower the coherence of each of the coherent light beams by disarranging the equal-phase plane of the coherent light propagating in the optical fiber. This condition is also effective to spatially overlap, at the emitting end of the fiber, coherent light beams that are scattered on the incident surface 13 of the light-converging optical system. To obtain higher effect in the speckle reduction, it is desirable to make the length of the optical fiber several tens of centimeters to several meters. By using the optical fiber having such length, a miniaturization effect of the apparatus according to the increase in flexibility in design of the optical system can also be achieved.

Because in the illumination light source $1a$ according to the first embodiment, the surface emitting laser 2 in which the divergence angles α and β of the coherent light beam 3 emitted from each of the light emitting points 10 are extremely close to 0 degree is used as a light source, the inequality (5) in the condition (a) and the inequality (6) in the condition (b) are expressed particularly as follows:

$$L \geq B/a \quad (7)$$

$$T \leq \frac{c}{\sqrt{(aL)^2 + B^2}} \quad (8)$$

Specifically, the coherent light beams 3 that are emitted from the surface emitting laser 2 are shaped such that the diameter 14 on the yz plane is larger than the diameter 15 on the xz plane by the magnifying-lens optical system 4 having the magnification L that satisfies inequality (7), and are coupled to the optical fiber 6 that satisfies the condition (c) by the light-converging optical system 5 having the magnification that satisfies inequality (8). Thus, the convergence angle of the coherent light beams emitted from the surface emitting laser 2 becomes large, and the spatial intensity distributions, the propagation angles, and the divergence angles thereof become substantially equal to each other. Therefore, low-coherence light can be obtained from the illumination light source $1a$.

As described above, the illumination light source according to the first embodiment that is constituted of the magnifying-lens optical system 4, the light-converging optical system 5, and the optical fiber 6 that satisfy the above conditions (a), (b), and (c), or inequalities (7) and (8), can output low-coherence light while maintaining the monochromatic property and the high directivity of laser, and is realized with a simple configuration. For example, by incorporating the illumination light source in an illumination device of an image display apparatus, an image display apparatus that is compact and in which the speckle noise is suppressed to have high image quality can be provided.

While in the first embodiment, a surface emitting laser is used as an example of a coherent light source that has a plurality of light emitting points arranged in one-dimensional array, the present invention is not limited thereto, and, for example, solid-state lasers from which beams are emitted in an array, a semiconductor laser that has a plurality of light emitting points, or the like can be used.

As described above, in the first embodiment, a plurality of coherent light beams that are emitted from the coherent light source 102 in which the light emitting points 10 are arranged in a one-dimensional array are respectively input to the optical fiber 106 at a large incident angle by the action of the magnification optical system 104 and the light-converging optical system 105. Therefore, the multiple reflection can be caused frequently in the optical fiber 106, thereby disarranging the wavefront of each of the coherent light beams to lower the coherence of each of the coherent light beams. Furthermore, because the respective coherent light beams are coupled to the optical fiber at an equal maximum incident angle, the divergence angles thereof become equal to each other, and because the diameter in the direction of arrangement of the light emitting points becomes sufficiently small compared to the maximum diameter of the entire light, the propagation angles of the coherent light beams become equal to each other. Further, each of the coherent light beams input to the optical fiber spreads to have a rotationally symmetrical spatial intensity distribution relative to the center axis of the optical fiber while propagating in the optical fiber, thereby making the overlap with the other coherent light beam large at the emitting end of the optical fiber. Thus, at the emitting end of the optical fiber, the coherent light beams spatially overlap with each other, and have an equal divergence angle and propagation angle in any direction. Therefore, it is possible to make the optical axes of the coherent light beams coincide with each other at the emitting end of the optical fiber. Accordingly, the coherence of the light emitted from the coherent light source is reduced, and this effect is maintained also in a subsequent optical system. If the first embodiment is applied to an illumination light source in which a laser is used as a coherent light source, the coherence of the light source can be lowered with a simple configuration, and for example, by incorporating the illumination light source in an image display apparatus, the speckle noise is reduced and a high quality image is obtained.

Figure 9:
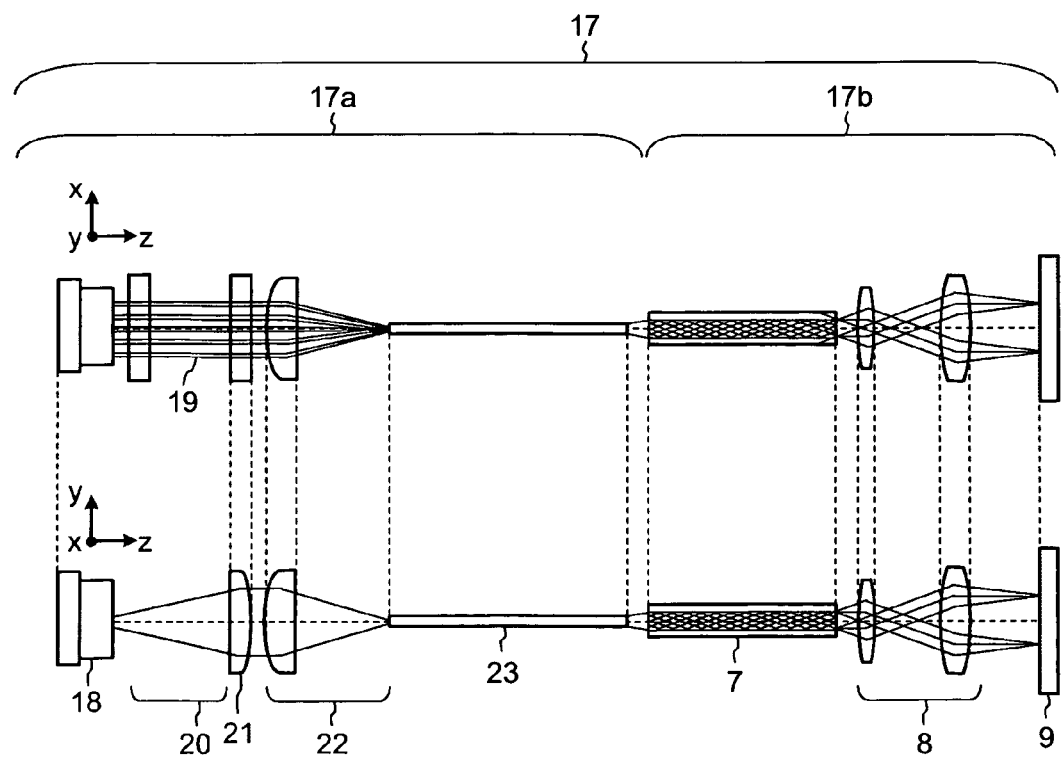
FIG. 9 is a configuration diagram of an illumination device according to a second embodiment of the present invention.

FIG. 9 is a configuration diagram of an illumination device using an illumination light source according to a second embodiment of the present invention. An illumination device 17 according to the second embodiment includes an illumination light source $17a$ and an illumination optical system $17b$.

The illumination light source $17a$ includes a semiconductor laser 18 that has a plurality of light emitting points as a coherent light source and that emits coherent light beams having a divergence angle from the light emitting points, a free propagation space 20 to magnify a plurality of coherent light beams 19 that are emitted from the semiconductor laser 18 to satisfy the above condition (a), a collimating lens 21, a light-converging optical system 22 to converge the semiconductor laser beams that are magnified and shaped into a desirable shape, and an optical fiber 23.

Similarly to the first embodiment, the illumination optical system $17b$ includes the integrator rod 7 that makes a spatial intensity distribution of light that is emitted from the optical fiber 23 uniform, the illumination optical system 8 that is constituted of a lens and a mirror, and the light bulb 9 such as a liquid crystal panel and a DMD serving as a modulation device that provides an image signal by spatially modulating illuminated light. By further including a projection optical system (not shown) that projects on a screen in an enlarged manner to project light emitted from the light bulb 9 in an enlarged manner, and a display unit (not shown) such as a screen on which light from the projection optical system is projected, an image display apparatus such as an image projection apparatus can be configured.

In the semiconductor laser 18 according to the second embodiment also, as shown in FIG. 2, the light emitting points 10 are arranged at regular intervals in the x direction, and a coherent light beam having the divergence angle α that is sufficiently large with respect to the size of a light emitting point on the yz plane and the divergence angle β that are sufficiently large with respect to a light emitting point on the xz plane is emitted from each of the light emitting points 10. In the semiconductor laser used in the second embodiment, 10 pieces of the light emitting points 10 are linearly arrange at 300 micrometer intervals, a half angle at half maximum αx of the divergence angle of the coherent light beam emitted from each of the light emitting points 10 on the yz plane is approximately 15 degrees, and a half angle at half maximum β of the divergence angle on the xz plane is approximately 5 degrees. Specifically, in this case, it is α>β.

Because the coherent light beams 19 emitted from the light emitting points 10 in the semiconductor laser 18 have an equal oscillation wavelength, a monochromatic property is excellent as an entire laser beam. Furthermore, because each of the coherent light beams has directivity, the directivity of the entire light is also high. On the other hand, because the coherent light beams emitted from the respective light emitting points are generated by different resonators, phases thereof are not uniform. Therefore, the coherent light beams are incoherent with each other, and the coherence of the entire semiconductor laser is low. However, because the coherence of only the coherent light beam 19 that is emitted from each of the light emitting points 10 is considerably high, to reduce influence of the speckle noise, similarly to the first embodiment, it is necessary to lower the coherence of each of the coherent light beams 19 that are generated from the light emitting points 10. Furthermore, to make these coherent light beams spatially overlap with each other at an emitting end of the illumination light source 17a and to propagate these coherent light beams keeping such spatial overlap, it is necessary to arrange such that the propagation angles and the divergence angles of the coherent light beams 19 are equal at the emitting end of the optical fiber 6, which is the emitting end of the illumination light source 17a. The principle of coherence reduction by overlapping the coherent light beams 19 is as described in the first embodiment.

In the second embodiment, similarly to the first embodiment, the convergence angle of each of the coherent light beams with respect to the optical fiber is set large, and the laser beams are spatially overlapped, thereby lowering the coherence. Furthermore, to maintain this in a subsequent optical system also, it is configured to satisfy all of the above conditions (a), (b), and (c) so that the propagation angle and the divergence angle of each of the coherent light beams are equalized. While in the first embodiment, to satisfy the condition (a), light beams emitted from the surface emitting laser 2 are magnified and shaped into a desirable shape by the magnifying-lens optical system 4 as the magnification optical system, in the second embodiment, the magnification optical system that satisfies the condition (a) is provided by using the semiconductor laser 18 that emits a plurality of coherent light beams having a divergence angle and by securing the free propagation space 20, thereby achieving a similar effect as the first embodiment.

In the illumination light source 17a according to the second embodiment, the semiconductor laser 18 in which the coherent light beam that is emitted from each of the light emitting points 10 has the divergence angles α and β is used as a light source, and the free propagation space 20 is provided as the magnification optical system. Therefore, the inequality (5) in the conditions (a) and the inequality (6) in the condition (b) are expressed particularly as follows:

$$l_s \geq \frac{B - a}{2(\tan\alpha - \tan\beta)} \quad (9)$$

$$T \leq \frac{c}{\sqrt{(a + 2l_s\tan\alpha)^2 + (B + 2l_s\tan\beta)^2}} \quad (10)$$

Specifically, the coherent light beams 19 that are emitted from the semiconductor laser 18 are shaped such that the diameter 14 on the yz plane is larger than the diameter 15 on the xz plane by providing the free propagation space 20 having the distance $l_s$ that satisfies inequality (9), and are coupled to the optical fiber 23 that satisfies the condition (c) by the light-converging optical system 22 having a magnification T that satisfies inequality (10). Thus, the convergence angle of the coherent light beams 19 emitted from the semiconductor laser 18 becomes large, and the spatial intensity distributions, the propagation angles, and the divergence angles thereof become substantially equal to each other. Therefore, low-coherence light can be obtained from the illumination light source 17a.

The laser beams obtained by providing the free propagation space 20 that satisfies the inequality (9) are input to the light-converging optical system 22 that satisfies the condition (b) in a similar manner as the first embodiment, and the coherence thereof becomes low while propagating in the optical fiber 23 that satisfies the condition (c). This is maintained also in a subsequent optical system on the arbitrary xy plane.

As described above, the illumination light source according to the second embodiment that is constituted of the free propagation space 20, the collimating lens 21, the light-converging optical system 22, and the optical fiber 23 that satisfy the above conditions (a), (b), and (c), and inequalities (9) and (10), can output low-coherence light while maintaining the monochromatic property and the high directivity of laser, and is realized with a simple configuration. Particularly, in the second embodiment, only with the characteristic that a laser beam has a divergence angle, and use of the free propagation space 20 and the collimating lens 21, the effect of lowering the coherence is achieved. Therefore, further simplification of the optical system as a result of reduction of an optical device is possible. For example, by incorporating the illumination light source in an illumination device of an image display apparatus, an image display apparatus that is compact and in which the speckle noise is suppressed to have high image quality can be provided.

While in the second embodiment, a case of the semiconductor laser in which the divergence angle on the yz plane is larger than that on the xz plane has been described, the present invention is not limited thereto. For example, when a semiconductor laser in which the divergence angle on the xz plane is larger than that on the yz plane is used, by providing a magnifying-lens optical system in addition to the free propagation space, or by adding a lens that acts on a divergence angle of a laser beam on the xz plane, a similar effect can be achieved. Further, even when a semiconductor laser in which the divergence angle on the yz plane is larger than that on the xz plane is used as in the second embodiment, by combining the free propagation space and a magnifying-lens optical system, a distance from the light emitting surface of the laser to the light-converging optical system can be shortened, and therefore, the apparatus can be further miniaturized.

While in the second embodiment, a semiconductor laser that includes a plurality of light emitting points is used as an example of a coherent light source, the present invention is not limited thereto, and, for example, a light source in which lasers that emit coherent light beams having a divergence angle are arranged in a one-dimensional array or the like can be used.

As described above, according to the second embodiment, when a coherent light source emits coherent light beams having a divergence angle, the coherent light beams are shaped such that the diameter 14 of the coherent light on the yz plane is larger than the diameter on the xz plane by the free propagation space 20 having the distance $l_s$ that satisfies the inequality (9), and the shaped light beams are coupled to the optical fiber 23 that satisfies the condition (c) by the light-converging optical system 22 having the magnification T that satisfies in the inequality (10). Thus, the convergence angle of each of the coherent light beams can be made large, and the coherent light beams spatially overlap with each other at the emitting end of the optical fiber 23 and have the divergence angle and the propagation angle that are equal to each other in any direction. Therefore, it is possible to make the optical axes of the coherent light beams coincide with each other at the emitting end of the optical fiber 23. Accordingly, the coherence of the light emitted from the coherent light source is lowered, and this effect is maintained also in a subsequent optical system. If the second embodiment is applied to an illumination light source that uses a laser as a coherent light source, the coherence of the light source can be lowered with a simple configuration, and, for example, by incorporating the illumination light source in an image display apparatus, the speckle noise is reduced and a high quality image is obtained.

While in the first embodiment and the second embodiment, an integrator rod is used as a device to uniform a special light intensity distribution of an illumination optical system, the present invention is not limited thereto. For example, another device to uniform the spatial light intensity distribution such as a microlens can be used. By using a device having an effect of making the spatial light intensity distribution of light uniform, such as the integrator rod 7, some reduction of the coherence is expected, and therefore, it is preferable to use the illumination light source of the present invention combining therewith.

According to the present invention, a plurality of coherent light beams that are emitted from a coherent light source in which a plurality of light emitting points are arranged in a one-dimensional array are respectively input to an optical fiber at a maximum incident angle in a direction perpendicular to a direction of arrangement of the light emitting points by the action of a magnification optical system and a light-converging optical system. Therefore, the multiple reflection can be caused frequently in the optical fiber, thereby disarranging the wavefront of each of the coherent light beams to lower the coherence of each of the coherent light beams. Furthermore, because each of the coherent light beams with an equal maximum incident angle is coupled to the optical fiber, the divergence angles thereof become equal to each other, and because the diameter in the direction of arrangement of the light emitting points becomes sufficiently small compared to the maximum diameter of the entire light, the propagation angles of the coherent light beams become equal to each other. Further, each of the coherent light beams input to the optical fiber spreads to have a rotationally symmetrical spatial intensity distribution relative to the center axis of the optical fiber while propagating in the optical fiber, thereby making the overlap with the other coherent light beam large at the emitting end of the optical fiber. Thus, at the emitting end of the optical fiber, the coherent light beams spatially overlap with each other, and have an equal divergence angle and propagation angle in any direction. Therefore, it is possible to make the optical axes of the coherent light beams coincide with each other at the emitting end of the optical fiber. Accordingly, the coherence of the light emitted from the coherent light source is reduced, and this effect is maintained also in a subsequent optical system. If the present invention is applied to an illumination light source in which a laser is used as a coherent light source, the coherence of the light source can be lowered with a simple configuration, and for example, by incorporating the illumination light source in an image display apparatus, the speckle noise is reduced and a high quality image is obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An illumination light source comprising:
    a coherent light source in which a plurality of light emitting points that emit coherent light beams are arranged in a one-dimensional array;
    a light magnifying unit that magnifies the coherent light beams that are emitted from the light emitting points so that a diameter of light emitted from the coherent light source in a direction perpendicular to a direction of arrangement of the light emitting points is larger than a diameter in the direction of arrangement of the light emitting points;
    an optical fiber; and
    a light-converging optical system in which a magnification is set such that light emitted from the light magnifying unit is coupled to the optical fiber, based on a maximum diameter of the light emitted from the light magnifying unit.

2. The illumination light source according to claim 1, wherein
    the light magnifying unit includes a magnifying-lens optical system, and satisfies:

$$R \geq \frac{B + 2(l_s + l_r)\tan\beta}{a} \left( \because R = \frac{(a + 2l_s\tan\alpha)L}{a} \right),$$
$$B = d \cdot (n-1) + b$$
$$T \leq \frac{c}{\sqrt{\{(a + 2l_s\tan\alpha)L\}^2 + \{B + 2(l_s + l_r)\tan\beta\}^2}},$$

where R is a magnification of the light magnifying unit on a yz plane defined by a y-axis which is in the direction perpendicular to the direction of arrangement of the light emitting points and a z-axis which is in a direction of an optical axis of the coherent light beam, B is a diameter of a whole laser beam on an xz plane defined by an x-axis which is in the direction of arrangement of the light emitting points and the z-axis, a is a diameter of the coherent light beam that is emitted from the light emitting point on the yz plane, $l_s$ is a spatial propagation distance of light from a light emitting surface of the light source to the magnifying-lens optical system, $l_r$ is a required distance of the magnifying-lens optical system, β is a half angle at half maximum of a divergence angle of the light emitting point on the xz plane, α is a half angle at half maximum of the divergence angle of the light emitting point on the yz plane, L is a magnification of the magnifying-lens optical system that acts only on the yz plane of light, d is a distance between the light emitting points, n is the number of light emitting points of the coherent light source and is an arbitrary number equal to or larger than 2, b is a diameter of the coherent light that is emitted from the light emitting point on the xz plane, T is a magnification in the light-converging optical system, and c is a diameter of the optical fiber, and
    the optical fiber has such a length that each of the coherent light beams is reflected at least once therein.

3. The illumination light source according to claim 1, wherein
    the light magnifying unit includes a magnifying-lens optical system,
    the coherent light source includes a plurality of light emitting points that emit substantially parallel coherent light beams, and satisfies:

$$L \geq B/a,$$
$$B = d \cdot (n-1) + b,$$
$$T \leq \frac{c}{\sqrt{(aL)^2 + B^2}}$$

where L is a magnification of the magnifying-lens optical system that acts only a yz plane defined by a y-axis which is in the direction perpendicular to the direction of arrangement of the light emitting points and a z-axis which is in a direction of an optical axis of the coherent light beam, B is a diameter of a whole laser beam on an xz plane defined by an x-axis which is in the direction of arrangement of the light emitting points and the z-axis, a is a diameter of the coherent light beam that is emitted from the light emitting point on the yz plane, d is a distance between the light emitting points, n is the number of light emitting points of the coherent light source and is an arbitrary number equal to or larger than 2, b is a diameter of the coherent light that is emitted from the light emitting point on the xz plane, T is a magnification in the light-converging optical system, and c is a diameter of the optical fiber, and the optical fiber has such a length that each of the coherent light beams is reflected at least once therein.

4. The illumination light source according to claim 1, wherein the coherent light source includes a semiconductor laser in which a plurality of light emitting points that emit coherent light beams are arranged in a one-dimensional array.

5. The illumination light source according to claim 1, wherein the coherent light source includes a surface emitting laser.

6. The illumination light source according to claim 1, wherein the coherent light source includes solid-state lasers arranged in an array.

7. The illumination light source according to claim 1, wherein
the light magnifying unit includes a free propagation space, and satisfies:

$$l_s \geq \frac{B-a}{2(\tan\alpha - \tan\beta)},$$
$$B = d \cdot (n-1) + b,$$
$$T \leq \frac{c}{\sqrt{(a+2l_s\tan\alpha)^2 + (B+2l_s\tan\beta)^2}}$$

where $l_s$ is a distance along an optical axis in the free propagation space, B is a diameter of a whole laser beam on an xz plane defined by an x-axis which is in the direction of arrangement of the light emitting points and a z-axis which is in a direction of an optical axis of the coherent light beam, a is a diameter of the coherent light beam that is emitted from the light emitting point on a yz plane defined by a y-axis which is in the direction perpendicular to the direction of arrangement of the light emitting points and the z-axis, α is a half angle at half maximum of a divergence angle of the light emitting point on the yz plane, β is a half angle at half maximum of the divergence angle of the light emitting point on the xz plane, d is a distance between the light emitting points, n is the number of light emitting points of the coherent light source and is an arbitrary number equal to or larger than 2, b is a diameter of the coherent light that is emitted from the light emitting point on the xz plane, and c is a diameter of the optical fiber, and the optical fiber has such a length that each of the coherent light beams is reflected at least once therein.

8. The illumination light source according to claim 7, wherein the coherent light source includes a semiconductor laser in which a plurality of light emitting points that emit coherent light beams are arranged in a one-dimensional array.

9. An image display apparatus comprising:
an illumination light source;
an illumination optical system that outputs illumination light;
a light modulating device that controls the illumination light that is input from the illumination optical system to form an image; and
a display unit that displays light from the light modulating device, wherein
the illumination light source includes
a coherent light source in which a plurality of light emitting points that emit coherent light beams are arranged in a one-dimensional array;
a light magnifying unit that magnifies the coherent light beams that are emitted from the light emitting points so that a diameter of light emitted from the coherent light source in a direction perpendicular to a direction of arrangement of the light emitting points is larger than a diameter in the direction of arrangement of the light emitting points;
an optical fiber; and
a light-converging optical system in which a magnification is set such that light emitted from the light magnifying unit is coupled to the optical fiber, based on a maximum diameter of the light emitted from the light magnifying unit.

\* \* \* \* \*